(12) United States Patent
Verfuerth

(10) Patent No.: US 6,746,274 B1
(45) Date of Patent: Jun. 8, 2004

(54) MOTION DETECTOR FLUORESCENT LIGHT CONNECTOR APPARATUS

(76) Inventor: Neal R. Verfuerth, 642 Western Ave., Random Lake, WI (US) 53075

( * ) Notice: Subject to any disclaimer, the term of this patent is extended or adjusted under 35 U.S.C. 154(b) by 0 days.

(21) Appl. No.: 10/429,744

(22) Filed: May 6, 2003

(51) Int. Cl.[7] .............................................. H01R 11/00
(52) U.S. Cl. ...................... 439/505; 439/502; 439/638; 439/623; 174/72 A
(58) Field of Search ................................ 439/505, 502, 439/235, 638, 623, 650; 174/69, 71 R, 72 A; 362/219

(56) References Cited

U.S. PATENT DOCUMENTS

| | | | | | |
|---|---|---|---|---|---|
| 4,001,571 A | * | 1/1977 | Martin | ........................ | 315/189 |
| 4,146,287 A | * | 3/1979 | Jonsson | ........................ | 439/368 |
| 5,357,170 A | | 10/1994 | Luchaco | ........................ | 315/159 |
| 5,489,827 A | | 2/1996 | Xia | ........................ | 315/294 |
| 5,673,022 A | | 9/1997 | Patel | ........................ | 340/565 |
| 5,676,563 A | * | 10/1997 | Kondo et al. | ............... | 439/502 |
| 5,855,494 A | * | 1/1999 | Blaszczyk et al. | .......... | 439/502 |
| 6,091,200 A | | 7/2000 | Lenz | ........................ | 315/159 |
| 6,151,529 A | | 11/2000 | Batko | ........................ | 700/28 |
| 6,291,770 B1 | * | 9/2001 | Casperson | ............... | 174/72 A |
| 6,420,839 B1 | | 7/2002 | Chiang et al. | ............. | 315/311 |
| 6,496,756 B1 | | 12/2002 | Nishizawa et al. | ......... | 700/264 |
| 6,540,549 B2 | * | 4/2003 | Rupert | ........................ | 439/502 |
| 2002/0189841 A1 | * | 12/2002 | Patterson | ................. | 174/72 A |

OTHER PUBLICATIONS

Electrical Eng. Handbook: 14th Edition; McGraw Hill Pub ISBN #0070220050; Editor Fink et al.: p. 26–57.

* cited by examiner

Primary Examiner—Tho D. Ta
(74) Attorney, Agent, or Firm—Robert T. Johnson

(57) ABSTRACT

This invention includes a motion detector, electric connector harness apparatus, and master-slaves and connections to fluorescent tube light fixtures and electric power line connected to the motion detector, or to a master-slave in the electric connector harness apparatus and the motion detector responding to any motion in its field of view to activate lighting of the fluorescent light fixtures.

2 Claims, 8 Drawing Sheets

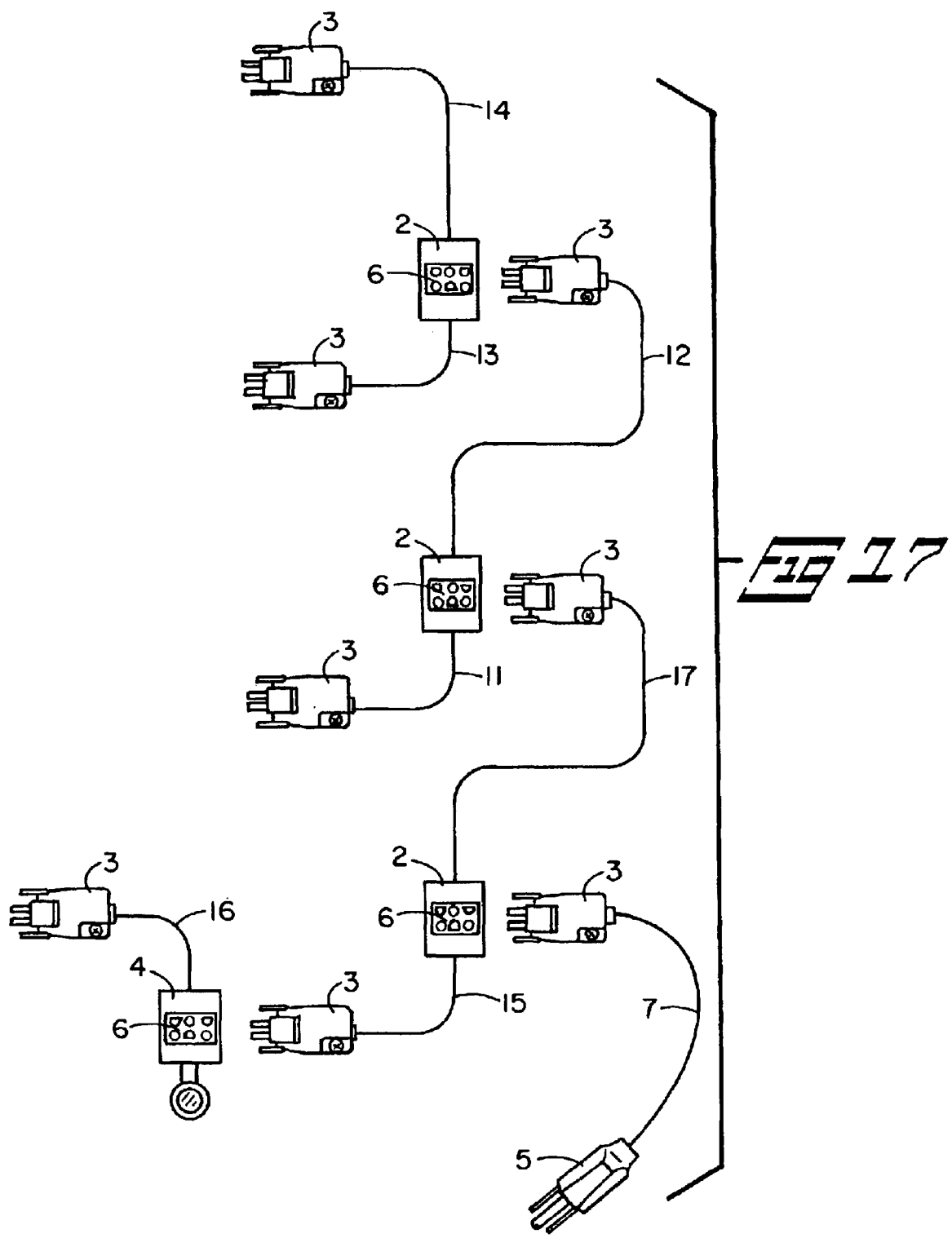

MOTION DETECTOR FLUORESCENT LIGHT CONNECTOR APPARATUS

BACKGROUND OF THIS INVENTION

This invention is to disclose, and claim, motion detector fluorescent electric light connector harness apparatus to activate fluorescent lights to the "on", status, when activated by the response of the motion detector to a detected motion in the field of the motion detector.

PRIOR ART

The prior art listed does not either collectively show this invention to be obvious, or to be anticipated by any one of the cited prior art patents.

OBJECTS OF THE INVENTION

An object of this invention is to disclose an electrical wiring harness including a master-slave electrically wired to a motion detector and a master-slave wired to one or a plurality of fluorescent tube luminaire fixtures and the master-slave connected to another master-slave in turn connected to another fluorescent tube luminaire fixture.

Another object of this invention is to disclose an electrical wiring harness including master-slaves, and female MATE-N-LOK sections mounted in each master-slave and on each fluorescent tube luminaire fixture, and male MATE-N-LOK sections attached to wires of the electrical wiring harness to plug into a female MATE-N-LOK on a master-slave, or fluorescent tube luminaire fixture to complete a circuit for operation of the master-slave connected to a motion detector to actuate lighting of the fluorescent tube luminaire fixture or luminaire fixtures connected thereto.

Another object is to disclose a motion detector wired to one or a plurality of fluorescent tube luminaire fixtures and a master-slave component wired to each luminaire and the master-slave component connected by wire to the motion detector through MATE-N-LOK connectors at the master-slave, and the wire from the master-slave connected to the fluorescent tube luminaire fixture via a male MATE-N-LOK section attached to the wire from the master-slave plugged into a female MATE-N-LOK connector section attached to the fluorescent tube luminaire fixture and wired to the ballast and fluorescent tubes of the luminaire for actuating on/off lighting of the fluorescent tubes of the fluorescent tube luminaire fixture or fixtures.

BRIEF DESCRIPTION OF DRAWINGS

Figure 1:
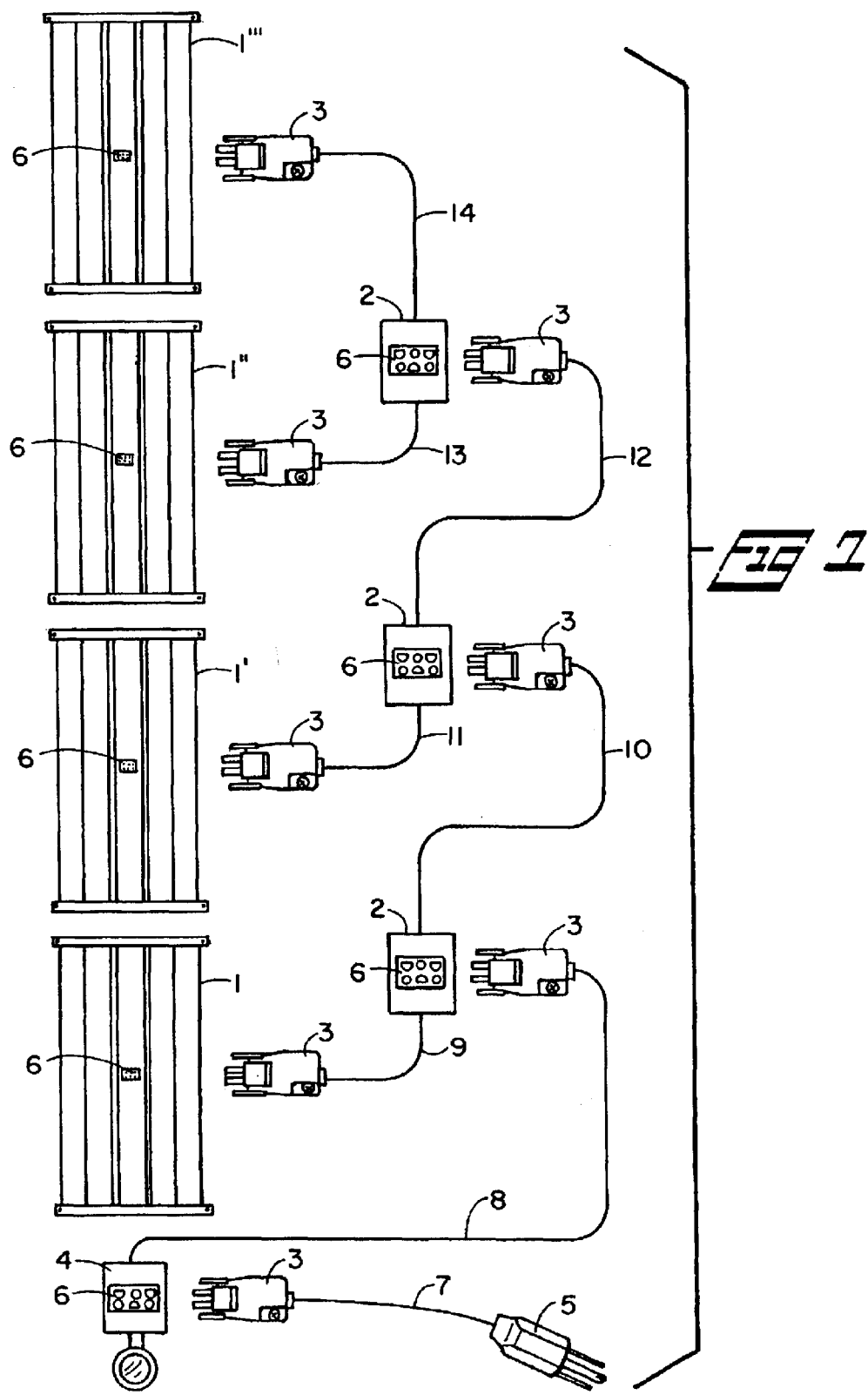

| FIG. NUMBER | DESCRIPTION |
|---|---|
| 1. | Wiring harness assembly to motion detector and fluorescent tube luminaire fixtures. |
| 2. | Alternate wiring harness assembly to motion detector and fluorescent tube luminaire fixtures. |
| 3. | Enlarged drawing of master-slave showing male sections of MATE-N-LOK connectors attached to wiring harness, and female section of MATE-N-LOK mounted in master-slave. |
| 4. | Enlarged drawing of motion detector showing female section of MATE-N-LOK mounted on the motion detector and a male section of MATE-N-LOK attached to wire from the motion detector. |
| 5. | End view of male section of MATE-N-LOK connector. |
| 6. | Electric power supply connector cord having standard three prong male section and MATE-N-LOK male section on the opposite end from the standard three prong male plug section. |
| 7. | Elevation view of female MATE-N-LOK aligned for snap fit into spine of fluorescent tube luminaire. |
| 8. | Elevation view of female MATE-N-LOK snapped into aperture of spine of fluorescent tube luminaire. |
| 9. | Plan view of aperture in spine of fluorescent tube luminaire. |
| 10. | Elevation view of alignment of male section of MATE-N-LOK to plug into female section of MATE-N-LOK section on spine of fluorescent tube luminaire. |
| 11. | Plan view of female MATE-N-LOK section mounted in aperture of spine of fluorescent tube luminaire. |
| 12. | Plan view of top of fluorescent tube luminaire fixture, and motion detector mounted on the luminaire |
| 13. | Elevation view of fluorescent tube luminaire fixture, and motion detector mounted on the luminaire. |
| 14. | Perspective view of fluorescent tube luminaire fixture, and motion detector mounted on the luminaire. |
| 15. | Cross section view of fluorescent tube luminaire fixture. |
| 16. | Electric power harness to connect lighting fixtures to be actuated to "on" by motion detector. |
| 17. | Alternate electric power harness to connect lighting fixtures to be actuated to "on" by motion detector. |

LEGEND DESCRIPTION

| LEGEND NO. | DESCRIPTION |
|---|---|
| 1,1',1",1'" | Plan view of fluorescent tube luminaire fixtures. |
| 2 | Master-slave units. |
| 3 | Male connector sections of MATE-N-LOK connectors. |
| 4 | Motion detector. |
| 5 | Three prong standard male electric plug to plug into power source. |
| 6 | Female sections of MATE-N-LOK connectors |
| 7 | Electric connecting cord having male section of MATE-N-LOK connector on one end and three prong standard male electric plug on the opposite end of the connecting cord. |
| 8 | Wire from motion detector to male MATE-N-LOK connector section. |

-continued

| LEGEND NO. | DESCRIPTION |
| --- | --- |
| 9 | Wire from master-slave to male MATE-N-LOK connector section. |
| 10 | Wire from master-slave to male MATE-N-LOW connector section. |
| 11 | Wire from master-slave to male MATE-N-LOK connector section. |
| 12 | Wire from master-slave to male MATE-N-LOK connector section. |
| 13 | Wire from master-slave to male MATE-N-LOK connector section. |
| 14 | Wire from master-slave to male MATE-N-LOK connector section. |
| 15 | Wire from master-slave to male MATE-N-LOK connector section. |
| 16 | Wire from motion detector to male MATE-N-LOK connector section. |
| 17 | Wire from master-slave to male MATE-N-LOK connector section. |
| 18 | Spine of luminaire. |
| 19 | Aperture opening for female MATE-N-LOK connector section. (snap fit) |
| 20 | Bundle of wires from female MATE-N-LOK to ballast and fluorescent tubes of luminaire fixture. |
| 21 | Fluorescent tubes in fluorescent tube luminaire fixture. |
| 22 | Downlight reflectors of fluorescent tube luminaire fixture. |
| 23 | Hanger chain or cord. |

DETAILED DESCRIPTION OF THE INVENTION

The motion detector and wiring harness apparatus of this invention includes as shown in FIG. 1 electric connecting cord 7, having male section of MATE-N-LOK (T.M. of AMP CORP. HARRISBURG, Pa.) connector 3 on one end of connector cord 7, and a three prong electric plug 5 on the opposite end of the electric connecting cord 7. Male connector section 3 of MATE-N-LOK to plug into female section 6 of MATE-N-LOK section in motion detector 4, and a male MATE-N-LOK connector 3 attached to wire 8 from motion detector 4 to plug into a female MATE-N-LOK section 6 connector mounted in master-slave unit 2, and wire 9, from master-slave unit 2 attached to a male connector section 3 of MATE-N-LOK connector, and this male connector section 3, attached to wire 9, to plug into a female section MATE-N-LOK connector 6, mounted in fluorescent tube luminaire fixture 1.

To add more fluorescent tube luminaire fixtures to be controlled by the motion detector 4, again referring to FIG. 1, wire 10 attached to master-slave 2 has a male MATE-N-LOK section 3" attached to the wire 10, opposite the master-slave 2, attached to wire 9, and male section 3 of MATE-N-LOK connector to plug into female section 6 of MATE-N-LOK master slave unit 2, and a male MATE-N-LOK section 3 attached to wire 11 from master-slave 2, and male connector 3 to plug into MATE-N-LOK female section 6 mounted on fluorescent tube luminaire fixture 1'. Wire 12 from master-slave 2 has attached thereto, on the end opposite the master-slave 2, a male section 3 MATE-N-LOK connector to plug into female section of MATE-N-LOK 6, in master-slave unit 2 and wire 13 from master slave unit 2 has a male section 3 of MATE-N-LOK connector on the wire 13 end opposite to the master slave unit 2, and the male connector section MATE-N-LOK 3 attached to wire 13, to plug into female section of MATE-N-LOK connector 6, mounted on fluorescent tube luminaire 1". A male connector section 3 of MATE-N-LOK connector is attached to wire 14 connected to master slave 6, and this male connector section 3 of MATE-N-LOK connector to plug into female section 6 of MATE-N-LOK connector attached to fluorescent tube luminaire fixture 1'''.

Figure 2:
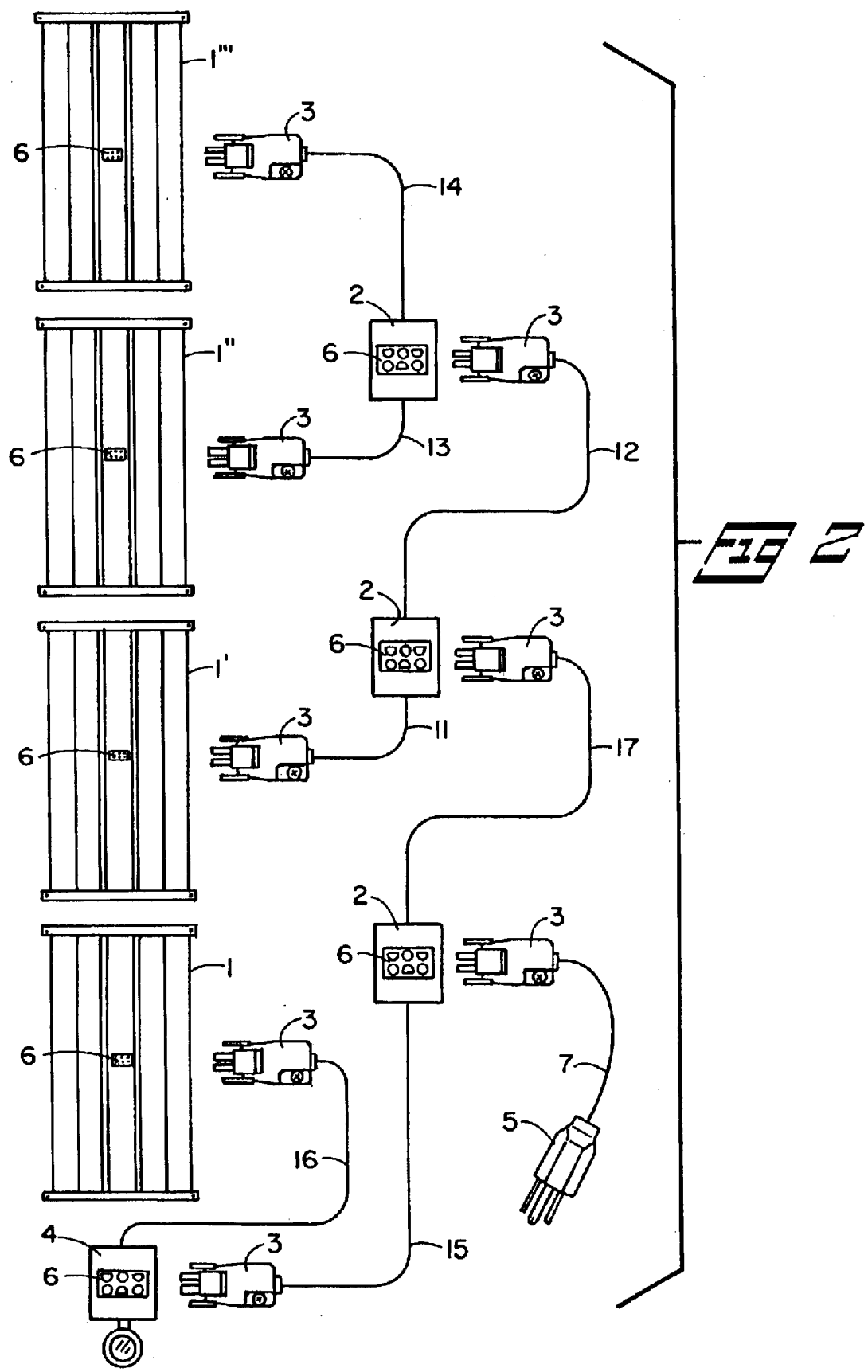
Figure 5:
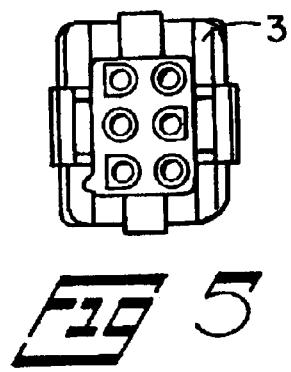
Figure 6:
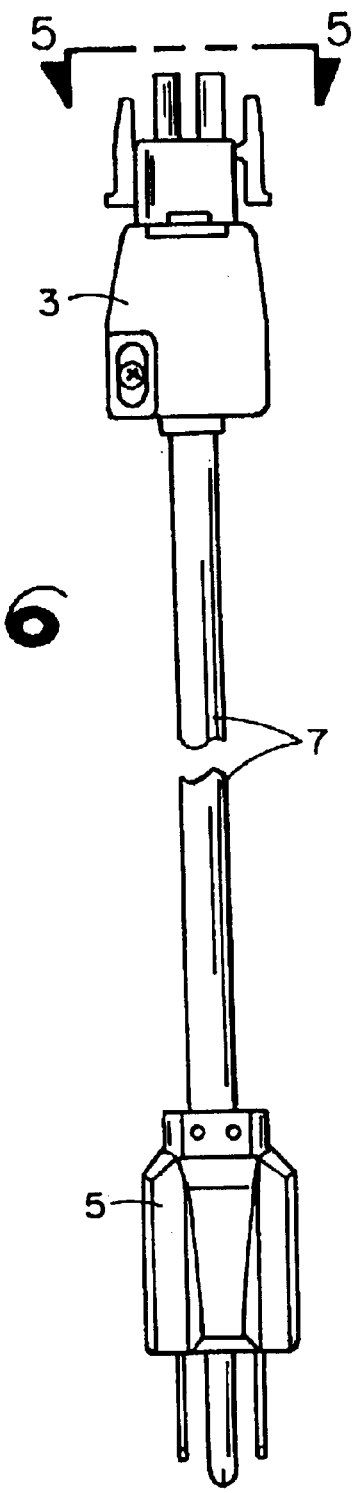

As an alternate to the above wiring harness apparatus, reference is made to FIG. 2 showing electric connecting cord 7 having a male section of MATE-N-LOK connector on one end and a three prong standard male electric plug on the opposite end of the connector cord 7, (see FIGS. 1, 5 and 6) and the male connector section 3, of the MATE-N-LOK connector to plug into a female section 6 of MATE-N-LOK connector attached to master slave unit 2, and wire 15 attached to the master slave unit 2 has a male connector section 3 of MATE-N-LOK connector attached to wire 15, and this male connector section 3 of MATE-N-LOK connector attached to wire 15, to plug into female section 6 of MATE-N-LOK connector attached to motion detector 4, and a male connector section 3 of MATE-N-LOK connector attached to wire 16, and this wire 16 attached to motion detector 4. The male connector section 3 of MATE-N-LOK connector attached to wire 16 from motion detector 4 to plug into female section of MATE-N-LOK connector 6 attached to fluorescent tube luminaire fixture 1. Wire 17 from master-slave 2, and master-slave 2 connected to wire 15 from master-slave and also connected to male connector section of MATE-N-LOK 3, this wire 17 attached to the same master-slave unit connected to wire 15 and a male section 3 MATE-N-LOK connector attached to end of wire 17 opposite to the end mounted in master-slave unit, and male section 3, attached to wire 17 from master-slave unit, this male section 3 MATE-N-LOK to plug into female section 6 of MATE-N-LOK master-slave unit connected to wires 11 and 12, and the remaining assembly connecting the fluorescent tube luminaire fixtures 1' 1" and 1''' to the wiring harness is the same as stated above in the detailed description of FIG. 1.

Figure 3:
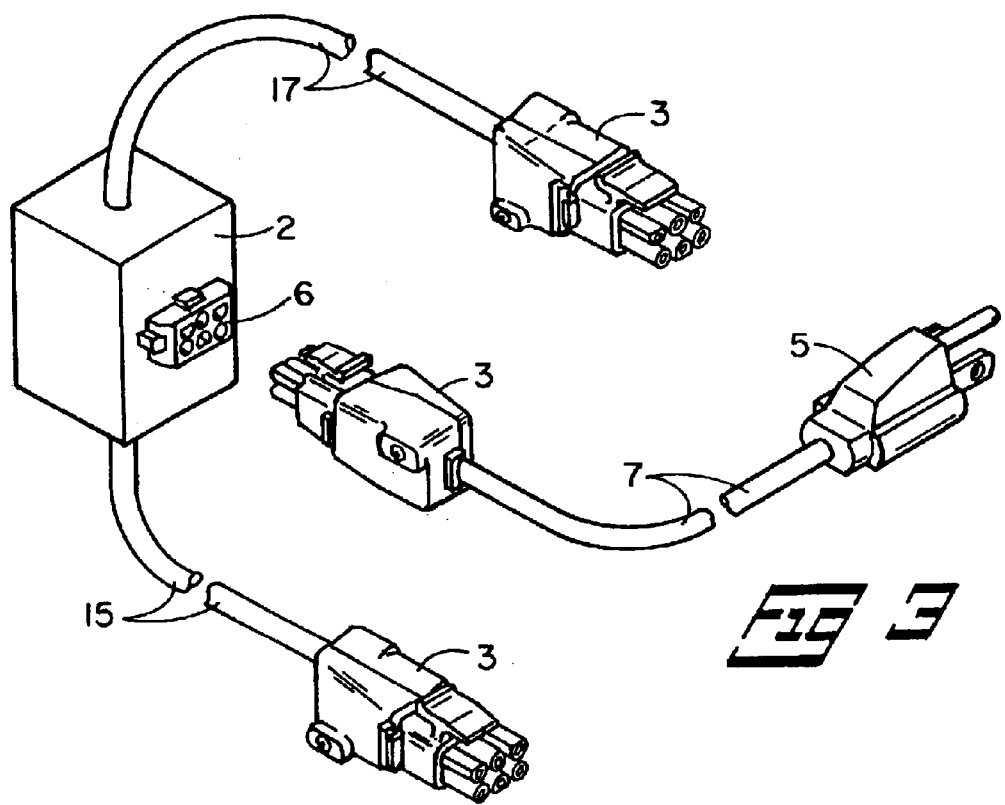

Referring to FIG. 3. which is an enlarged drawing of section of FIG. 1 motion detector 4 and female section 3 of MATE-N-LOK connector 6, mounted in the motion detector 4, and male connector section 3 of MATE-N-LOK connector attached to 7 electric connecting cord to plug into female section 6 of MATE-N-LOK connector mounted in motion detector 4, and three prong standard electric male plug 5 to plug into power source.

Figure 4:
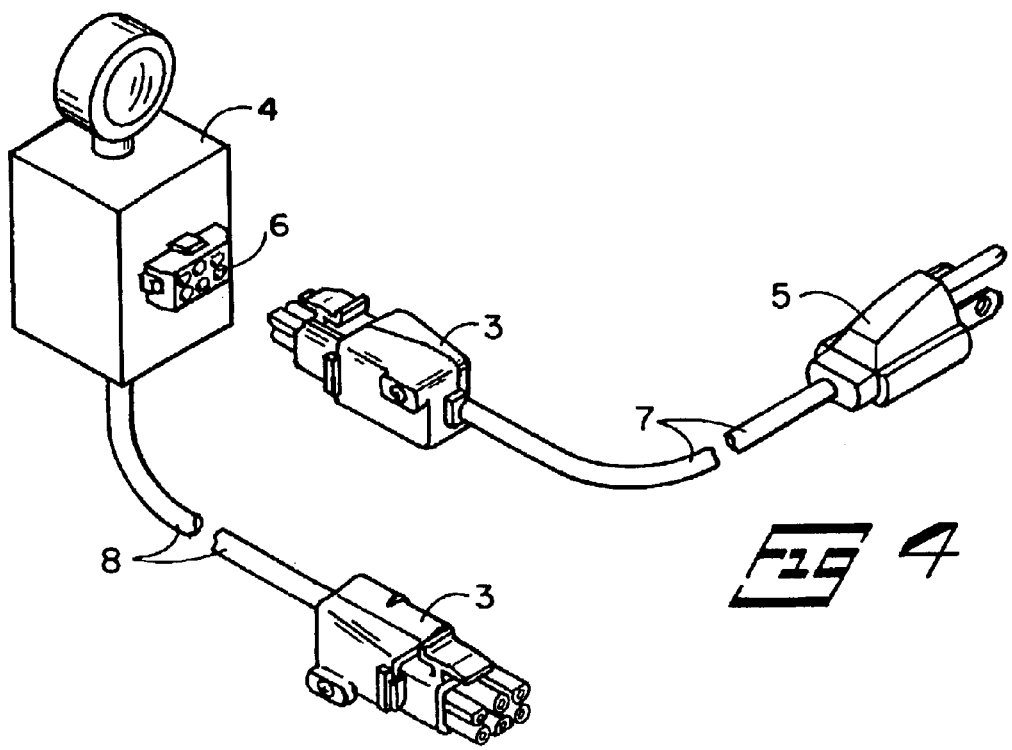

FIG. 4 is an enlarged drawing of section of FIG. 2 showing electric power connecting cord 7, having a three prong standard electric male plug 5 attached to one end of connector cord 7 to plug into a power source, and on the opposite end of the power cord 7 a male connector section 3 of MATE-N-LOK connector to plug into female section 6 MATE-N-LOK connector attached to master slave unit 2, and male connector section 3 of MATE-N-LOK connector attached to wire 15 from master-slave unit to plug into motion detector 4, as shown in FIG. 2. As further shown in this FIG. 4, a male connector section 3 of MATE-N-LOK connector attached to wire 17, which wire 17 is attached to master-slave unit 2, to plug into another master-slave 2 (as shown in FIG. 2)

Figure 7:
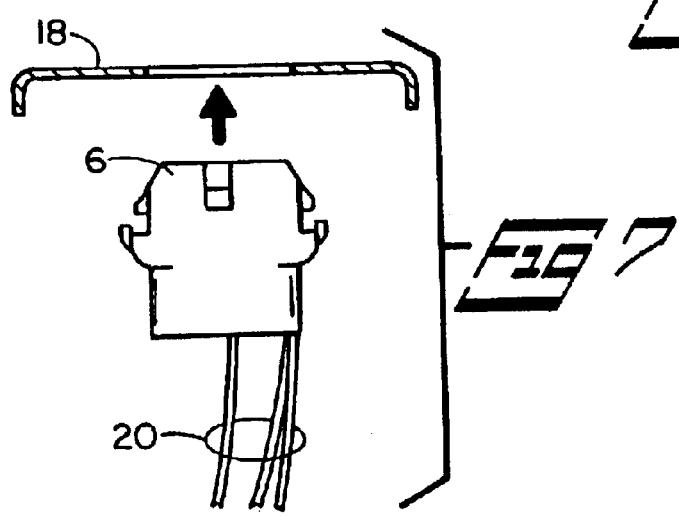
Figure 8:
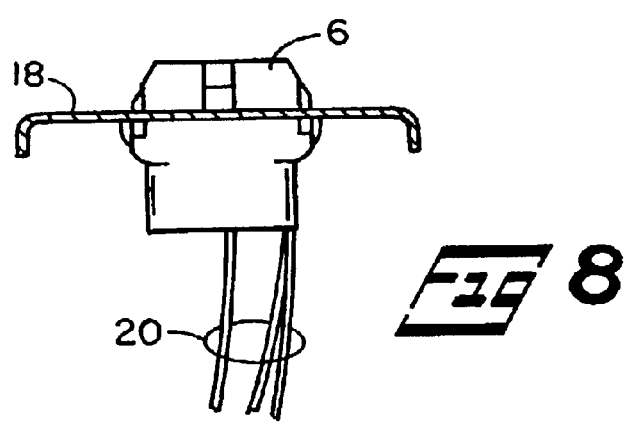
Figure 9:
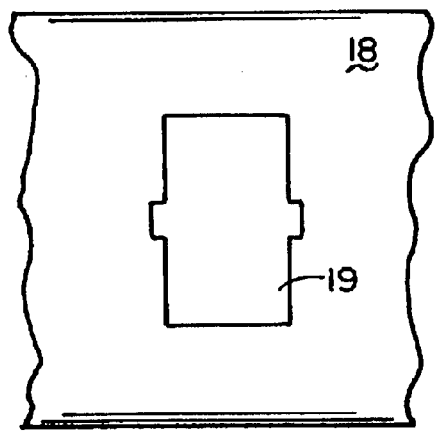
Figure 10:
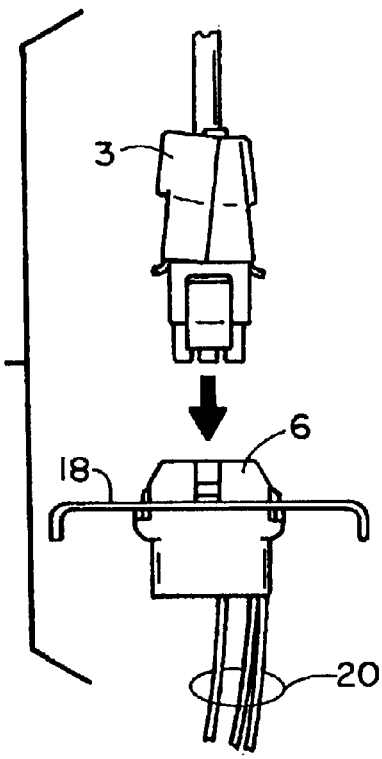
Figure 11:
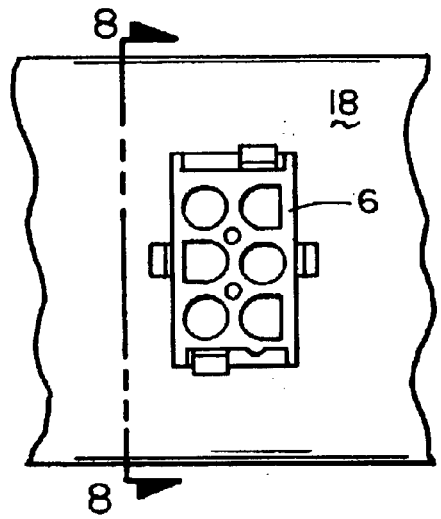

FIG. 7 shows the alignment of female section of MATE-LOK connector 6 for mounting, by snap fit, in aperture opening 19, in the back spine 18 of luminaire fixture 1,1', 1", 1''' as shown FIGS. 1,2,7,8,9,10 and 11,12,13, and 14. Referring again to FIGS. 7,8, and 10, bundle of wires 20, attached to female MATE-LOK connector section, extend to the ballast and fluorescent tubes 21 in luminaire fixtures.

Figure 12:
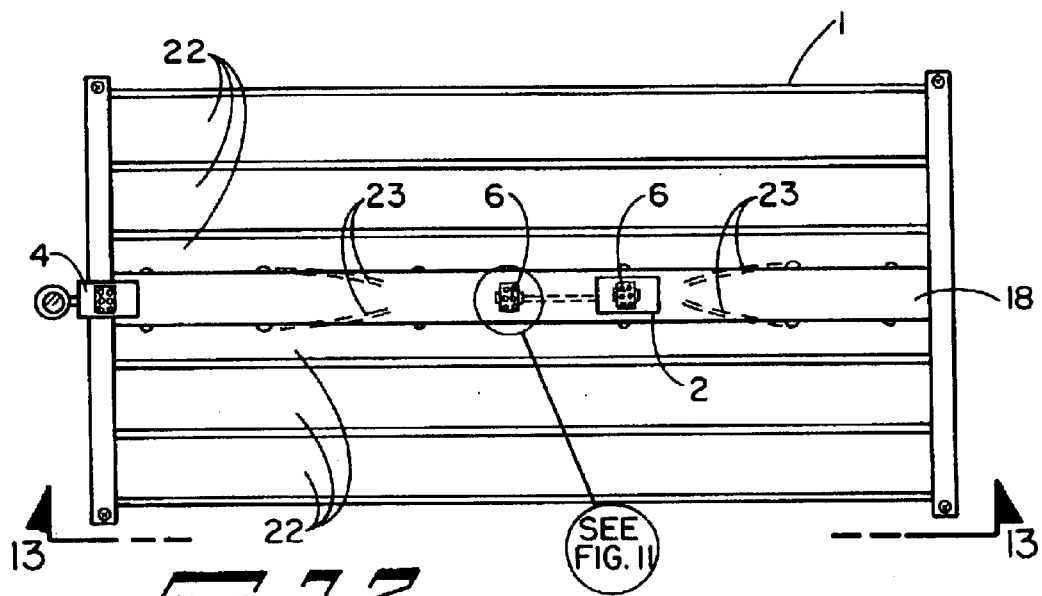
Figure 13:
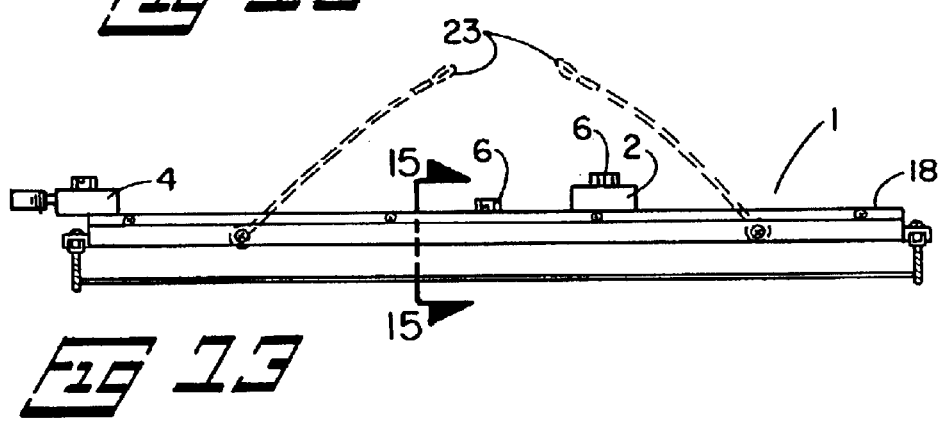
Figure 14:
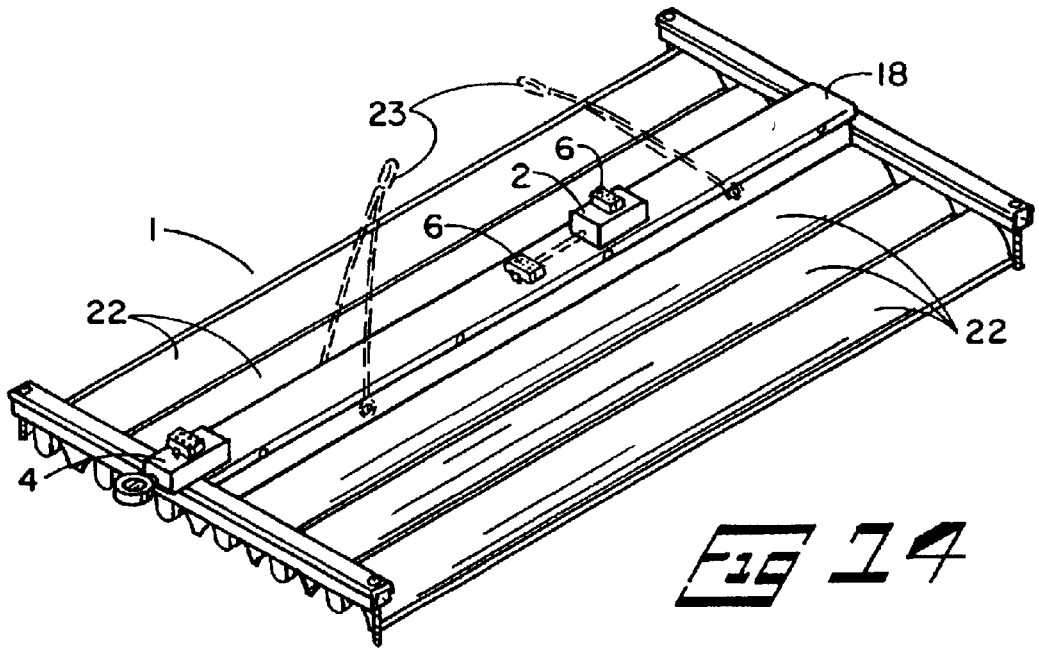

FIG. 12 is a plan view of fluorescent tube luminaire fixture showing motion detector 4 mounted on spine 18, and female section 6 of MATE-N-LOK connector mounted on spine 18, and a master-slave unit 2, having a female section 6 of MATE-N-LOK mounted in the master-slave unit 2 and this master-lave also mounted on spine 18 of the fluorescent tube luminaire fixture 1. FIG. 13 is an elevation view of fluorescent tube luminaire fixture 1, with same components as shown in FIG. 12. FIG. 14 is a perspective view of fluorescent tube luminaire fixture 1, with the same components as shown in FIGS. 12 and 13. Hanging chain or cord 23, is shown in all FIGS. 12, 13, and 14, and serves to hang the fluorescent tube luminaire fixture.

Figure 15:
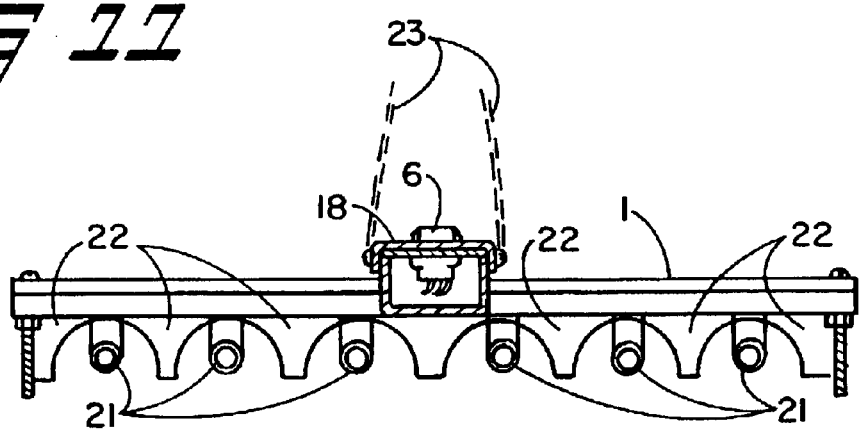

FIG. 15 is a cross section view of fluorescent tube luminaire fixture 1, and shows downlight reflectors 22 and fluorescent tubes 21 mounted under the reflectors 22. Female section 6 of MATE-N-LOK connector is shown mounted in the spine 18 of the luminaire 1, and hanging chain or cord 23 is shown.

Figure 16:
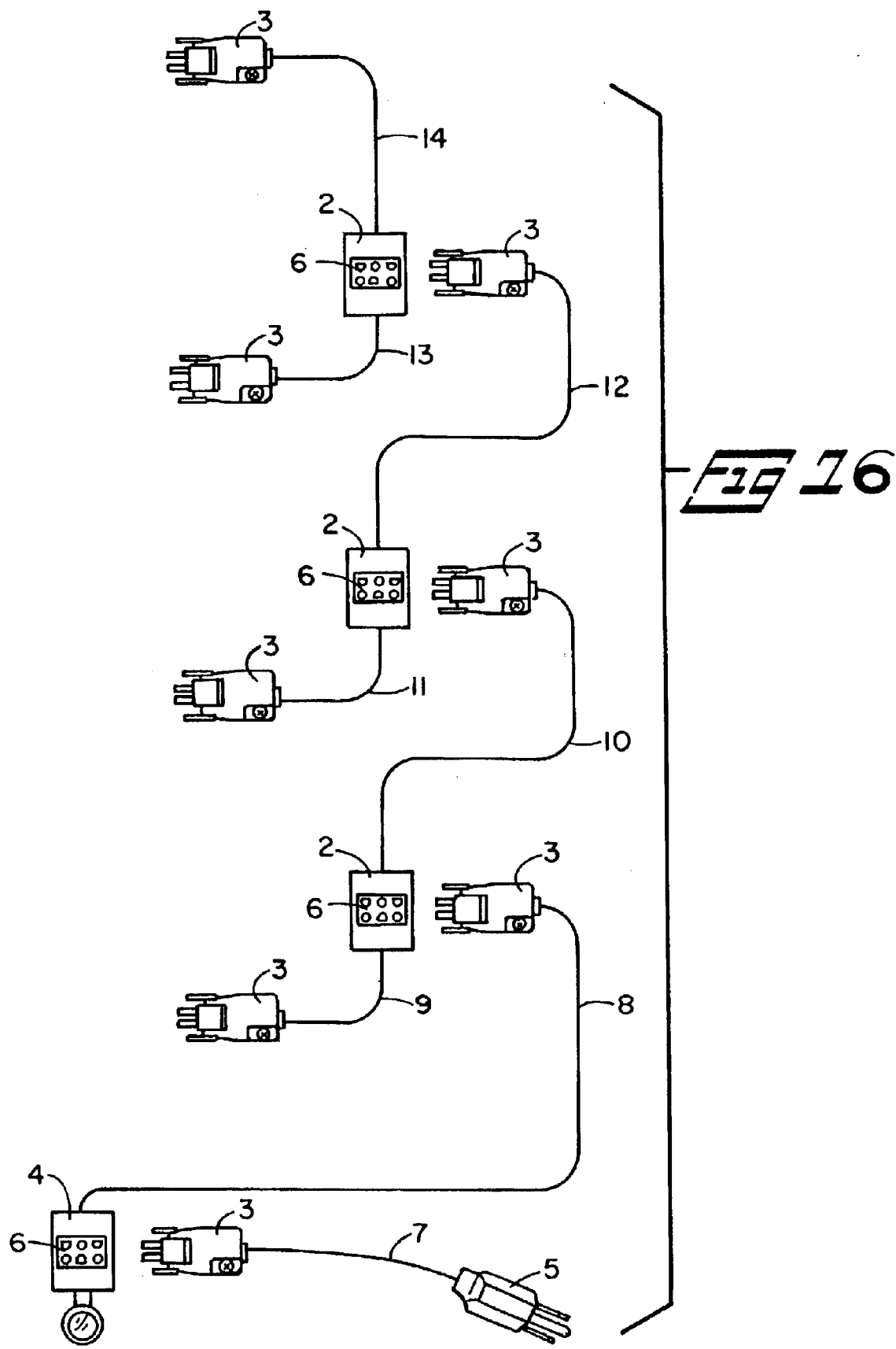

FIG. 16 is the wiring harness assembly for motion detector attached to fluorescent tube luminaire fixtures apart from the luminaire fixtures shown in FIG. 1. The legend components of the wiring harness are described above.

FIG. 17 is the wiring harness assembly for motion detector attached to fluorescent tube luminaire fixtures, with the power line 7 entering the harness at a master-slave 2 as shown and describe in FIG. 2.

What is claimed is:

1. Motion detector fluorescent light connector apparatus of an electric wire harness comprising;

a—an electric power connecting cord, and a male section of MATE-N-LOK connector on one end of said electric power connector cord, b—a three prong electric male plug on the opposite end of said electric power connecting cord, c—said male section of MATE-N-LOK connector to plug into a female section of MATE-N-LOK connector in a motion detector, d—a male section of MATE-N-LOK connector attached to a wire from said motion detector to plug into a female section of MATE-N-LOK connector mounted in a first master-slave unit, e—a first wire from said first master-slave unit attached to a male section of MATE-N-LOK connector, f—said male section of MATE-N-LOK connector attached to said first wire to plug into a female section of MATE-N-LOK connector mounted in a first fluorescent tube luminaire fixture, g—a male section of MATE-N-LOK connector, attached to a second wire attached to said first master-slave, plugs into a female section of MATE-N-LOK connector mounted in a second master-slave unit, h—a male section of MATE-N-LOK connector, attached to a first wire from said second master-slave, plugs into a female section of MATE-N-LOK connector mounted on a second fluorescent tube luminaire fixture, i—a male section of MATE-N-LOK connector, attached to a second wire from said second master-slave, plugs into a female section of MATE-N-LOK connector mounted in a third master-slave, j—a male section of MATE-N-LOK connector, attached to a first wire from said third master-slave, plugs into a female section of MATE-N-LOK connector mounted on a third fluorescent tube luminaire fixture, and k—a male section of MATE-N-LOK connector, attached to a second wire from said third master-slave, plugs into a female section of MATE-N-LOK connector mounted on a fourth fluorescent tube luminaire fixture.

2. Motion detector fluorescent light connector apparatus of an electric wire harness, further comprising;

a—Electric connecting cord and a male section of MATE-N-LOK connector on one end of said electric connector cord, and a three prong standard electric male plug on the opposite end of said electric connector cord, b—said male section of MATE-N-LOK connector on one end of said electric connecting cord to plug into a female section of MATE-N-LOK connector attached to a first master-slave, c—a male section of MATE-N-LOK connector, attached to a first wire from said first master-slave, plugs into a female section of MATE-N-LOK connector attached to a motion detector, d—a male section of MATE-N-LOK connector attached to a wire from said motion detector, plugs into a first fluorescent tube luminaire fixture, e—a male section of MATE-N-LOK connector, attached to a second wire from said first master-slave, plugs into a female section of MATE-N-LOK connector attached to a second master-slave, f—a male section of MATE-N-LOK connector attached to a first wire from said second master-slave, plugs into female section of MATE-N-LOK connector attached to said second fluorescent tube luminaire fixture, g—a male section of MATE-N-LOK connector, attached to a second wire from said second master-slave, plugs into a female section of MATE-N-LOK connector attached to a third master-slave, h—a male section of MATE-N-LOK connector, attached to a first wire from said third master-slave, plugs into a female section of MATE-N-LOK connector attached to a third fluorescent tube luminaire fixture, and i—a male section of MATE-N-LOK connector, attached to a second wire from said third master slave, plugs into a female section of MATE-N-LOK connector attached to a fourth fluorescent tube luminaire fixture.

* * * * *